United States Patent Office 3,526,619
Patented Sept. 1, 1970

3,526,619
2,4,5-TRICHLOROPHENYLAZO-2-PHENYLINDOLE
Heinz Haubrich, Leverkusen, Germany, assignor to Farbenfabriken Bayer Aktiengesellschaft, Leverkusen, Germany, a corporation of Germany
No Drawing. Filed Aug. 31, 1967, Ser. No. 664,650
Int. Cl. C09b *29/36;* D06p *1/02, 3/04*
U.S. Cl. 260—165                                     1 Claim

ABSTRACT OF THE DISCLOSURE

An azo dyestuff especially useful for dyeing and printing of hydrophobic textiles or fibers, the dyestuff having the formula

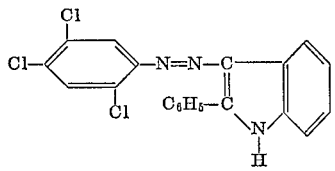

and a process for its preparation by coupling diazotized 2,4,5-trichloroaniline with 2-phenylindole.

---

The object of the present invention comprises a valuable new yellow dyestuff which is obtained by coupling diazotized 2,4,5-trichloroaniline with 2-phenylindole. The coupling of the starting components is performed in known manner, preferably in aqueous acid solution or suspension at temperatures of 0–10° C. After completion of the coupling process, the resulting dyestuff, which is only slightly soluble in water may be separated from the reaction mixture by simple filtration.

The resulting dyestuff corresponds to the formula

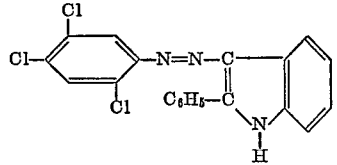

and is eminently suitable for the dyeing and printing of materials, e.g., fibres and textiles made of hydrophobic materials, especially of textiles or fibres made of aromatic polyesters, for example polyethyleneterephthalates and synthetic superpolyamides. Dyeings obtained on such materials are characterized by very good fastness to light and washing.

The parts given below are parts by weight.

EXAMPLE

A solution of 196.5 parts of 2,4,5-trichloroaniline in 1000 parts of sulfuric acid monohydrate is slowly diazotized by addition of 69 parts of sodium nitrite. After stirring for half an hour the solution is poured onto ice and a solution of 194 parts of 2-phenylindole in 450 parts of sulfuric acid is added. The pH value of the resulting solution is adjusted to 1.8–2 by the addition of an aqueous solution of sodium hydroxide or sodium acetate. After completion of the reaction the resulting dyestuff separates in the form of dark crystals which are suction filtered, washed until neutral and dried at 50–60° C.

25 parts of synthetic superpolyamide fibres are introduced at 50° C. into a bath of 4 litres containing 4 parts of an emulsifying polyglycol ether, 0.4 parts of the well dispersed dyestuff and 10 parts of a carrier, for example benzoic acid and 20 parts of diammonium phosphate. The bath is brought to the boil within 30 minutes and dyeing is continued at the same temperature for 1½–2 hours. The dyeing is subsequently washed alkaline at 70° C. for 20 minutes, rinsed and dried. A clear yellow dyeing is obtained which is fast to light and washing.

What is claimed is:
1. The monoazo dyestuff of the formula

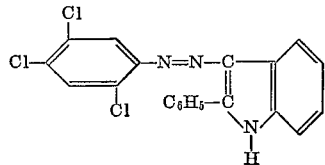

References Cited
UNITED STATES PATENTS

| | | | |
|---|---|---|---|
| 1,835,393 | 12/1931 | Hentrich et al. | 260—165 |
| 2,970,994 | 2/1961 | Kruckenberg | 260—165 |
| 3,255,173 | 6/1966 | Dehnert et al. | 260—165 XR |
| 3,347,844 | 10/1967 | Rhyner et al. | 260—165 |

FLOYD D. HIGEL, Primary Examiner

U.S. Cl. X.R.

260—578, 319.1, 37; 8—41, 4; 117—138.8